May 6, 1930.  V. C. BENJAMIN ET AL  1,757,355
MULTIDISK SUCTION FILTER
Filed Jan. 4, 1928   2 Sheets-Sheet 1

PAUL W. PRUTZMAN
VICTOR C. BENJAMIN
INVENTORS

By Paul W. Prutzman
ATTORNEY

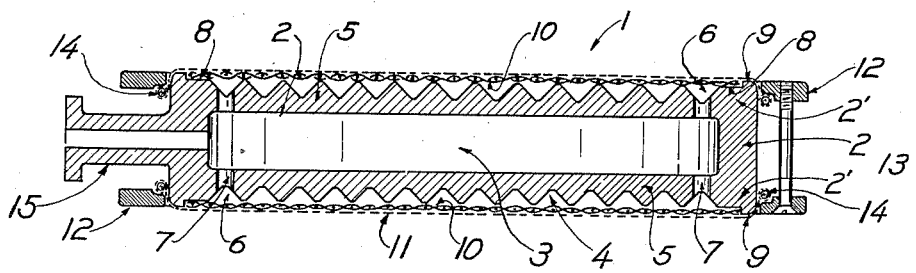
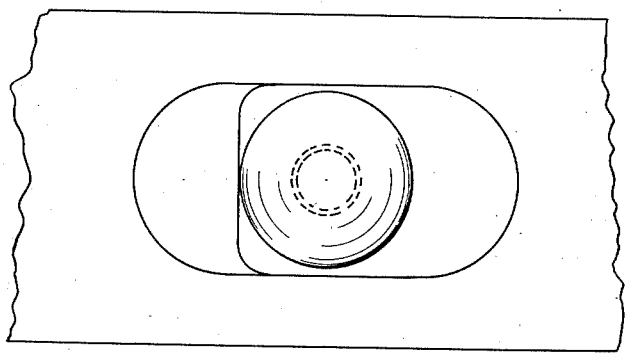
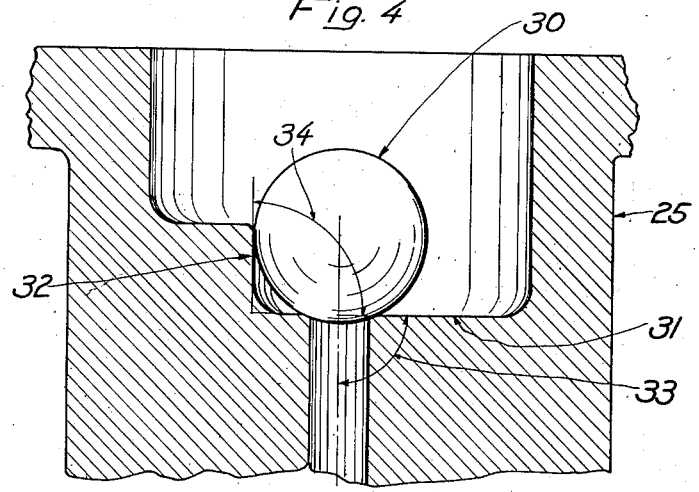

Patented May 6, 1930

1,757,355

UNITED STATES PATENT OFFICE

VICTOR C. BENJAMIN AND PAUL W. PRUTZMAN, OF LOS ANGELES, CALIFORNIA, ASSIGNORS TO CONTACT FILTRATION COMPANY, OF SAN FRANCISCO, CALIFORNIA, A CORPORATION OF DELAWARE

MULTIDISK SUCTION FILTER

Application filed January 4, 1928. Serial No. 244,537.

Suction filters, that is to say filters in which a foraminous medium stretched on a plate or frame is alternately immersed in and withdrawn from a bath containing the liquid and the solid to be separated, a pressure lower than atmosphere being maintained within space surrounded by the filtering medium, are old in the art. Numerous designs have been proposed and many of these have been manufactured and used in large quantities, but only two types have heretofore been successfully used. In the cylindrical or drum type a hollow cylinder, divided in segments by radial longitudinal partitions, is covered by rolling over its cylindrical surface a suitable cloth or other porous medium. The segmental disk type consists of a single disk of large diameter, divided by radial partitions into a series of wedge-shaped chambers, the sides of which are covered by the filtering cloth. In each of these types the material drawn through the cloth by the suction is carried through ports in the shaft by which the drum or disk is revolved into a multiple valve which cuts off the suction from each of the segments at the proper point in the revolution of the filtering elements. This point, for each segment, is theoretically the point at which the cake formed on the cloth is sufficiently freed from entrained oil, and ahead of the point at which the cake becomes so porous that the suction on the apparatus as a whole is materially reduced. These valves, having large wearing surfaces subject to corrosion by acid or alkaline liquors and to extreme wear from abrasive solids, are rapidly destroyed.

The object of our invention is to provide a device similar in many respects to the segmental disk filter but provided with independent disks of a substantially circular outline, each disk being provided with a valve by which the suction cut-off is effected at the proper point, these valves functioning independently and being of such construction as to be substantially free from wear. Further objects of our invention are: to economize filter cloth by reason of the circular section used; to provide an extremely quick and ready means for replacing worn filter cloths; to provide a means for adequately stretching the cloths so as to maintain them smooth and tight even after considerable wear, and to provide means for maintaining the submergence of each disk for a greater proportion of the total revolution than is possible where either the drum type or the segmental disk is used.

Figure 1:
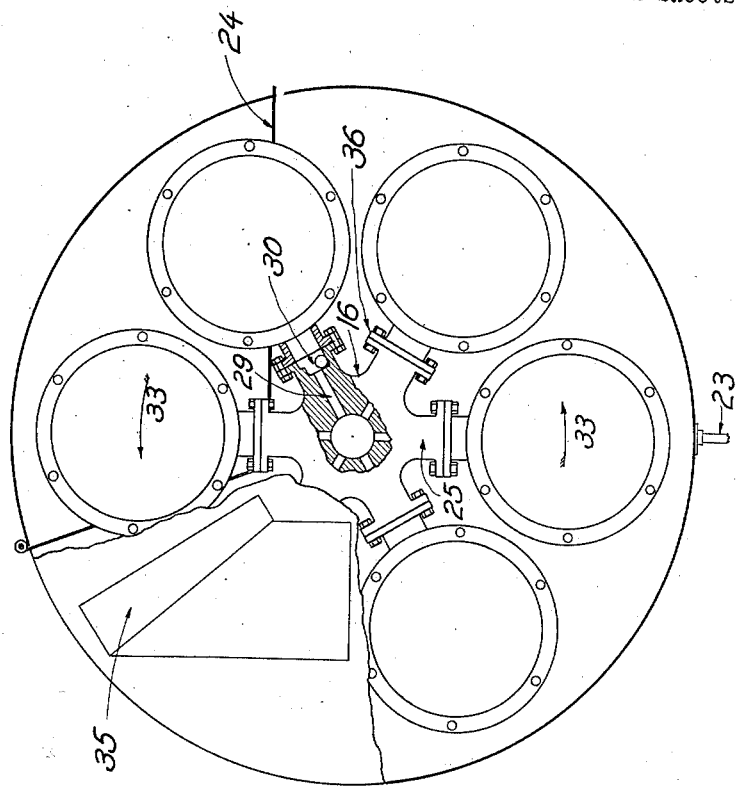
Figure 2:
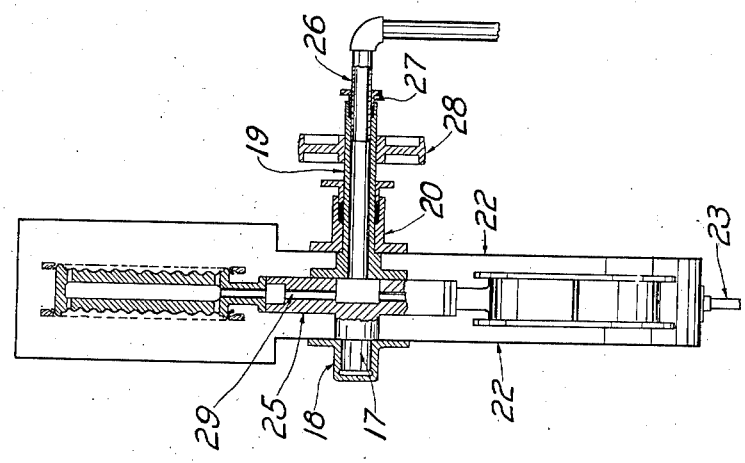

Other objects and advantages will be apparent from the following description, reference being made to the accompanying drawing in which Figure 1 is a front elevation of a preferred embodiment of our invention, showing the disks attached to the rotating hub, Figure 2 is a side sectional elevation on the center line of the machine, Figure 3 is a detail in section of a single filtering disk, Figure 4 is a detail of a valve, in the plane of rotation, and Figure 5 is a further detail of a valve, viewed radially toward the center of rotation.

The filtering disk designated by the numeral 1 is shown in detail in Fig. 3. It is a hollow metallic disk having webs as shown at 2 and a cored cavity 3. The cored faces 5 of these webs have cast or machined corrugations 4, these communicating with a common groove 6. A plurality of holes 7 drilled through the web connect this groove with the cavity 3.

The webs are supported by a ring wall 2', which at each side of the disk extend above the outer face of the web, forming an annular shelf 8 level with the peaks of the corrugations 4, and a smooth annular shoulder 9, of a height above the level of the shelf 8 equal to the thickness of the screens 10. This shoulder 9 is rounded on its outer edges to prevent cutting the cloths which are stretched over it.

The screen assembly indicated at 10 is for the purpose of holding the cloth in a true plane over the peaks of the corrugations, thus increasing both its life and its filtering value. The screens must at once be stiff enough to span the corrugations without bending and fine enough to hold the cloth flat. It is therefore desirable to use two or three layers of screen, as for instance a bottom layer of say 3/16" mesh, 12 gauge hard steel wire, a layer next above of say 10 mesh, 20 gauge hard brass screen, and a top layer of say 30 mesh, standard brass screen. These should be trimmed to exactly fit inside shoulder 9 and rest on shelf 8, and then soldered in place. Any protecting points or solder should be dressed down flush with the side face of shoulder 9. This procedure will prevent dislocation of screens when handling disks and puncturing of cloths when in use.

The cloths, which may be of any preferred material (as for instance, cotton ducks and twills or woven metal cloth) are cut to the shape of the disk 1, but say 2" greater in diameter. A stiff wire hoop 14 is then securely sewed into the edge, this hoop being of such size as to easily slip over the disk. This will leave the cloth loose and baggy. The cloths are then placed on the two sides of the disks and the annular rings 12, which should be of the same internal diameter as the hoops 14, are then slipped over the cloths and brought into engagement with the hoops, and on tightening the screws 13 the cloths may be drawn tight and smooth over the supporting screens and the shoulders 9. As the cloths stretch in use a sufficient tension to keep them smooth may be secured by further tightening of screws 13 from time to time. This manner of attaching and tightening the cloths has not, to our knowledge, been heretofore used, and we consider it a valuable feature of our invention.

A cored arm 15 is cast integral with the hollow disk and a flange is formed on its outer end, and faced. Such arm and flange forms an outlet for filtrate through the cored passage, and a means for securing the disk to the central spider 16.

It is important that the means for attaching the cored arm 15 to the spider 16 be of such nature that any disk may be readily detached and replaced. To this end we provide flanges on both these members, between which a suitable gasket should be used, and join these flanges (as shown in the drawing) by means of through-bolts and nuts. We prefer, however, to use studs screwed into the flange of the spider and passing through corresponding holes formed in the disk flange. A precaution which should be taken is to ensure the spotting of the disk on the spider in the exact plane of rotation. To this end dowel pins may be used, or the holes in the disk flange may be reamed to exactly fit over the studs. These bolt holes, however formed, should be spotted in a jig so that disks will be interchangeable.

In the complete filter a number of these filtering units or disks are assembled on a central spider 16, which rotates on a trunnion 17 adapted to run in a journal 18, and a hollow shaft 19 adapted to run in a combination journal and stuffing box 20. Both journals 18 and 20 are secured in the ends of the tank 22. The common axis of shaft 19 and trunnion 17 is horizontal.

The fluid to be filtered enters tank 22 through the pipe 23. The fluid level is maintained substantially constant at mark 24. The arms 25 carrying the disks are cored, providing radial passages 29 to the center of the spider, which in turn communicates with the passage in the hollow shaft 19. A pipe 26, inserted in the outer end of shaft 19 through the stuffing box 27, carries the filtrate away from the filter. Suction is maintained in the pipe 26 by a wet vacuum or other means not shown.

A belt pulley 28 mounted on shaft 18 is driven by a belt from a source of power not shown, thus rotating the spider and disks.

As the disks rotate in the direction indicated by arrows 33 they alternately pass through the clay-containing oil and into the atmosphere. As they emerge from the oil mixture, air is slowly drawn through the filter cake, removing entrained oil from the cake and draining the disks. As the cake are thus dried out an increasing amount of air would normally be drawn through them, tending to decrease the suction on the disks still submerged or sufficiently drained. To prevent this suction drop a ball check valve 30 is provided in each passage 29. The ball closes this passage when the disk has just passed the vertical upright position. This function is produced by forming a shoulder 31, substantially perpendicular to the axis of are arm 25, on the trailing side of the valve seat as regards rotation, on which shoulder the ball rests until said shoulder has passed through a horizontal plane, when the ball rolls by gravity to cover the valve seat. A shoulder 32 is provided on the leading side of the ball seat, forming a stop for the ball to prevent it from rolling past its seat. This stop should be located at a distance, from the center of the valve, not less or substantially more than the radius of the ball. Further rotation of the filter gradually inclines shoulder 32 until the weight of the ball is sufficient to overcome the suction pull, at which point the ball rolls off the seat and falls against the inner end of the cored arm 15, the cored hole in said arm being less in width than the diameter of the ball.

It is advantageous that the ball valve 30 close before the disk is entirely emptied of oil or before the rate of air suction through the dried cake is sufficient to materially reduce the suction on the submerged disks. This can be controlled by varying the angle of the shoulder 31 with reference to the axis of the arm 16. To illustrate: if angle 33 is greater than 90°, the ball will seat before the disk is in the vertical position. Conversely, of less than 90°, it will seat after the vertical position. In the same manner, by changing the angle 34 or the weight of the ball or the area of the valve seat, the position of the disk when the valve opens can be varied.

A means for removing the filter cake is shown at 35, this means consisting of a stationary scraper of steel or other suitable material, adapted to lightly bear on the cloth 11 on the filtering disks 1 as they pass by the scrapers.

The filter cake falls by gravity from the cloth into any suitable container. It is preferable to set this scraper at an angle of 20° to 30° to the axis of the cored arm 15, to provide a slicing action for more complete removal of cake.

The above described filter is particularly advantageous in the filtering of oil or other viscous liquids which have been treated with clay at a relatively high temperature. Such oils often contain a relatively large proportion of solids which build up cake very rapidly and, further, the high temperature of the oil rapidly destroys the cotton filter cloths which are the most desirable material for use in filtering clay out of oil. If the temperatures at which the filter is operated are such as to make it undesirable or dangerous to draw air through the filter, the upper portion of the tank may be closed in over the revolving element, the cake passing out through narrow ports in the case thus formed, and a slight outward movement of carbon dioxide, flue gases or other non-oxidizing gaseous medium maintained through such ports, thus substantially excluding air. In such construction the upper third of the case should be readily removed, or adequate doors placed in its sides.

We consider the use of ball valves highly advantageous as compared with the types of valves now in use for similar service. The rotary valve heretofore used consists of two flat disks provided with suitably matched ports to control the suction to the filtering units. A valve of this nature is subject to considerable wear, as its parts are continually sliding over each other. The ball valve as applied in our improved filter passes from one position to the other by rolling and when in either position its parts are stationary, thus eliminating friction and reducing wear to a minimum. Such valve is obviously more economical in operation and far cheaper in first cost than types heretofore used in this service.

In our improved filter, when it is necessary to renew the filtering cloths, the machine is stopped with the disk carrying the worn cloth in the vertical top position. This disk is then removed and replaced by another disk already fitted with new cloths. By this procedure any extended stoppage of the press is avoided and, what is of equal importance, the fitting of new cloths can be done on the bench at leisure, ensuring a proper fitting such as can hardly be made on a shut down press under emergency conditions. The proper degree of tension to prevent wrinkling of the cloth may easily be maintained by tightening the screws 13. This is a distinct advantage over filters of the rotating type heretofore used, these having no such provision for maintaining cloths tense and smooth.

If greater capacity is desired our improved filter can be built with a multiplicity of units (the unit comprising a set of filtering disks and a spider similar to spider 16) mounted on a common hollow shaft whose suction is the same as shaft 18. A tank similar to 22 serves all the filtering disks. The advantage of this arrangement is obvious: it doubles the filtering capacity; it retains the simplicity of the cloths; a common drive and a common suction serves all the units, and its increase in bulk is slight.

We have discovered that the efficiency of the scraper is materially helped by a proper tension on the filter cloth, and also by the slight working of the cloth when the ball valve closes and stops the suction, as this working helps materially in releasing the layer of clay adhering to the cloth.

We claim as our invention:

1. A vacuum filtering device comprising: a tank for holding the suspension to be separated by the filter; a hollow horizontal shaft entering the side of said tank and arranged to rotate therein; means for rotating said shaft; means for connecting said rotating shaft with a means for exhausting its interior; a spider mounted on said shaft; a plurality of filtering disks mounted on said spider; means for scraping separated solids from said disks; a channel connecting the interior of each of said disks with the interior of said shaft, said channel passing through said spider, and automatic valves mounted in said channels, each said valve comprising a seat formed around said channel; a ball adapted to fit and close said seat; a cage adapted to retain said ball; a stop on the leading side of said cage adapted to prevent said ball from overrunning said seat, said stop being substantially perpendicular to said seat, and a shoulder on the trailing side of said cage, said shoulder being substantially in the plane of said seat and adapted to direct said ball into said seat when said seat during rotation passes beyond a horizontal position.

2. A device substantially as and for the purpose set forth in claim 1, in which the disks are detachably mounted on the spider.

3. A device substantially as and for the purpose set forth in claim 1, in which the disks are detachable and interchangeable and lie in the plane of rotation.

4. A vacuum filtering device comprising: a tank for holding the suspension to be separated by the filter; a plurality of hollow filtering disks mounted on a means for rotating said disks within said tank; means of communication between said disks and an exhausting means located without said tank, and an independent automatic valve adjacent to each disk and adapted to successively cut off each such disk from said means of communication, each said valve comprising a seat formed within said means of communication; a ball adapted to fit and close said seat; a cage adapted to retain said ball; a stop on the leading side of said cage adapted to prevent said ball from overrunning said seat, said top being substantially perpendicular to said seat, and a shoulder on the trailing side of said cage, said shoulder being substantially in the plane of said seat and adapted to direct said ball into said seat when said seat during rotation passes beyond a horizontal position.

5. A device substantially as and for the purpose set forth in claim 2, in which the disks are detachably mounted on the rotating means.

6. A device substantially as and for the purpose set forth in claim 2, in which the disks are detachable and interchangeable and lie in the plane of rotation.

In witness that we claim the foregoing we have hereunto subscribed our names this 30th day of December, 1927.

VICTOR C. BENJAMIN.
PAUL W. PRUTZMAN.